May 19, 1964
J. B. JANZ
3,133,982
EYEGLASS SWEAT BANDS
Filed March 30, 1962
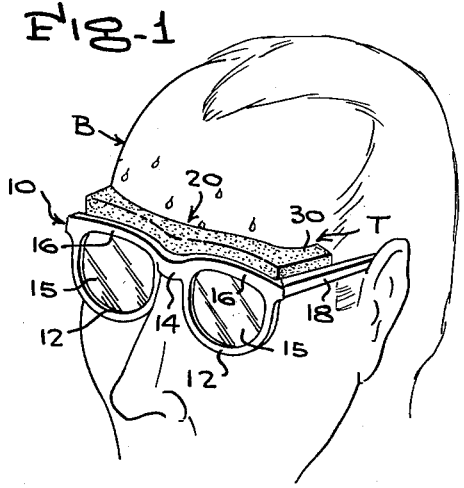
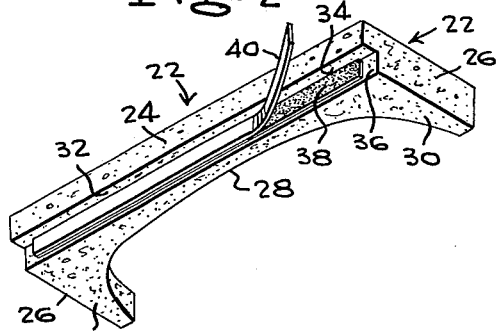
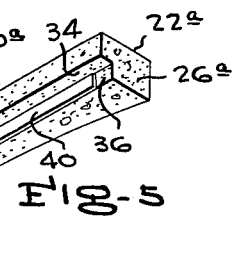
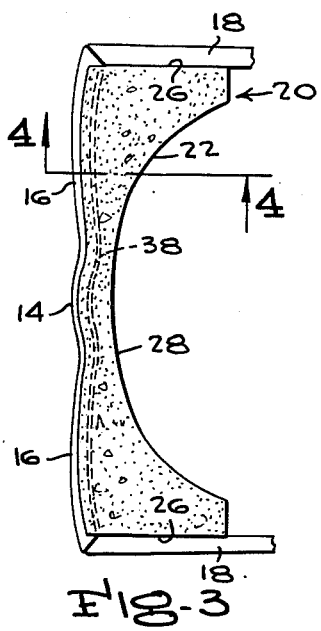
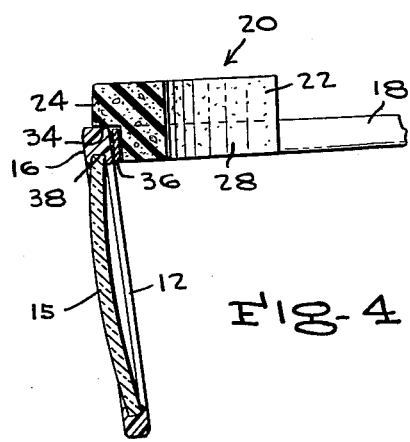
INVENTOR.
JOHN B. JANZ
BY
McMorrow, Berman & Davidson
ATTORNEYS

United States Patent Office 3,133,982
Patented May 19, 1964

3,133,982
EYEGLASS SWEAT BANDS
John B. Janz, 1704 S. 9th St., Omaha, Nebr.
Filed Mar. 30, 1962, Ser. No. 183,918
2 Claims. (Cl. 88—41)

This invention relates to novel sweat bands for eyeglasses.

The primary object of the invention is the provision of efficient, comfortable, practical, and easily applied devices of the kind indicated, which when applied to the back of eyeglasses bear conformably against the brow of the wearer and prevent sweat, accumulating on the brow or hair, from passing downwardly past the devices and reaching the frame and lenses of the eyeglasses and the eyes of the wearer.

Another object of the invention is the provision of devices of the character indicated above which are composed of highly absorbent material and are especially suitable for use by workers in high temperature occupations, and by participants in active sports, because of their light weight, secure mounting on eyeglass frames, and full conformances with the brows of the wearers.

A further object of the invention is the provision of devices of the character indicated above, which are composed of single pieces of resilient sponge-like resilient material, and adhesive bands which are initially covered by tear-off strips, for securing the devices to eyeglasses.

Other objects and advantageous features of the invention will be apparent from the following description and the accompanying drawings, wherein, for purposes of illustration only specific forms of the invention are set forth in detail.

In the drawings:

FIGURE 1 is a schematic perspective view showing a device of the invention applied to eyeglasses and bearing against the brow of a wearer;

FIGURE 2 is an enlarged bottom perspective view of said device, per se, showing the protective strip partly removed from the adhesive band;

FIGURE 3 is a fragmentary top plan view showing the device in place on eyeglasses;

FIGURE 4 is a vertical transverse section taken on the line 4—4 of FIGURE 3;

FIGURE 5 is a bottom perspective view of another form of device of the present invention.

Referring in detail to the drawings, wherein like and related numerals designate like and related parts throughout the several views, and first to FIGURES 1 through 4, an eyeglass 10 is shown which comprises lens frames 12 connected by a bridge or nose-piece 14, and containing lenses 15, the lens frames having top cross members 16, to whose outer ends temples 18 are hinged. Such eyeglasses are substantially conventional and are known as "spectacles" and constitute no part of the present invention, except in combination therewith. It will be understood that the devices of the present invention are applicable also to other forms of eyeglasses.

The spectacles 10 are shown equipped with a sweat band 20, in accordance with the present invention, which comprises a horizontally elongated flat block 22 of compressible absorbent sponge-like resilient material, preferably of sponge rubber or plastic sponge material. The block 22 is preferably rectangular cross section, as shown, has a straight front edge 24, and squared ends 26. The block 22 has a relatively deep concavely curved longitudinal rear edge 28, for conforming engagement with the brow B of a wearer of the spectacles. The ends of the curved edge 28 are near to and closely spaced from the ends 26 of the block 22. The transverse dimension of the block 22 is relatively great or wide, so that the indentation of the rear edge thereof which defines the edge 28 defines wings 30 which reach rearwardly and engage the temples T of the wearer.

The lower part of the front edge 24 of the block 22 is indented by a groove 32, which opens to the underside of the block, and provides a horizontal shoulder 34, which extends the length of the body, and a vertical surface 36. The surface 36 is covered by a band 38 of adhesive, which is covered by a protective tear-off strip 40.

To apply the device 20 to the spectacles 10, the strip 40 is torn off to expose the adhesive band, and the adhesive band engaged with the rear surfaces of the bridge 14 and the top cross members 16 of the spectacles, with the shoulder 34 engaged with the upper surfaces of the bridge and the cross members 16. The device is thereby securely mounted on the spectacles 10, and with a major portion thereof reaching above the level of the top cross members 16 of the lens frames 12 and the bridge 14, the wearer can remove and replace the spectacles without disturbing the position of the device 20 thereon. As sweat drops S move downwardly on the wearer's brow B and temples P, they are caught and absorbed by the block 22, and thereby prevented from getting into the wearer's eyes and reaching the frame and lenses of the spectacles. When the block 22 becomes wet with sweat, the same can be readily wiped to remove light sweat, or squeezed out and dried.

FIGURE 5 shows another form of device of the present invention, generally designated 20$^a$, which has a body 22$^a$ which differs from that of the device of FIGURES 1 to 4 in that the body 22$^a$ is narrower, and its curved rear edge 28$^a$ is shallower and extends to the ends 26$^a$ of the body 22$^a$.

Although there have been shown and described preferred forms of the invention, it is to be understood that the invention is not necessarily confined thereto and that any change or changes in the structure of and in the relative arrangements of components thereof are contemplated as being within the scope of the invention as defined by the claims appended hereto.

What is claimed is:

1. In combination, spectacles having lens frames having top cross sembers, a bridge between and connecting the lens frames, temples pieces hinged on the outer ends of said cross members, a horizontally-elongated block of compressible and resilient absorbent material and having a straight front edge, the lower part of said front edge being formed with a groove, said groove defining a horizontal shoulder and a vertical surface, adhesive extending over the vertical surface, said block being disposed so as to extend between and engaged by the temple pieces with the adhesive on the vertical surface engaged with the rear surfaces of the bridge and the top cross members, and the shoulder engaged with the upper surfaces of the bridge and the cross members.

2. The combination according to claim 1 wherein said block has a concave rear edge for conforming engagement with the brow of a wearer, the ends of the concave rear edges being spaced from the ends of the block and defining wings for engagement with the temples of a wearer.

References Cited in the file of this patent

UNITED STATES PATENTS

| 1,238,396 | Elwood | Aug. 28, 1917 |
| 2,267,288 | Rooke | Dec. 23, 1941 |
| 2,393,837 | Swanson | Jan. 29, 1946 |
| 2,496,969 | Wentworth | Feb. 7, 1950 |
| 2,547,467 | Hurst | Apr. 3, 1951 |
| 2,789,381 | Belgard | Apr. 23, 1957 |

FOREIGN PATENTS

| 1,114,648 | Germany | Oct. 5, 1961 |